March 1, 1949.　　　　　　　E. WITT　　　　　　　2,463,133
GARDEN RAKE

Filed April 8, 1947　　　　　　　　　　　　　2 Sheets-Sheet 1

Inventor
Emil Witt

By Clarence A. O'Brien
and Harvey B. Jacobson
Attorneys

March 1, 1949.  E. WITT  2,463,133
GARDEN RAKE

Filed April 8, 1947  2 Sheets-Sheet 2

Inventor
Emil Witt

By Clarence A. O'Brien
and Harvey B. Jacobson
Attorneys

Patented Mar. 1, 1949

2,463,133

UNITED STATES PATENT OFFICE 2,463,133

GARDEN RAKE

Emil Witt, Detroit, Mich.

Application April 8, 1947, Serial No. 740,030

5 Claims. (Cl. 56—400.01)

1

This invention relates to improvements in self-cleaning rakes.

An object of the invention is to provide an improved form of garden rake which will be formed with a series of oppositely extending teeth of different lengths.

Another object of the invention is to provide an improved self-cleaning rake formed with individual teeth stamped from a heavy gauge of metal and shaped to be supported upon a transverse square rod in abutting relation.

A further object of the invention is to provide an improved self-cleaning rake in which the individual teeth are stamped from a heavy gauge of metal to provide oppositely disposed working ends of uneven lengths, and the longer working ends are formed with outwardly extending reinforcing ribs which may be stamped out when said tooth is formed, or the same may be formed in any other desired manner.

Another object of the invention is to provide an improved form of self-cleaning rake including a handle with outwardly flared head supporting bracket arms secured thereto, together with an elongated body bolt connected between said bracket arms, and adapted to support a plurality of stamped and shaped cultivating elements having oppositely extending working teeth of different lengths arranged in spaced relation whereby heavy clods of earth may be broken up by the short teeth, and heavy earth may be deeply cultivated by the longer teeth which are reinforced by longitudinally extending reinforcing ribs suitably formed therein.

Another object of the invention is to provide an improved self-cleaning rake which will be highly efficient in operation and relatively inexpensive to manufacture and produce.

Other objects will appear as the description proceeds.

In the accompanying drawings which form a part of this application,

Figure 5:
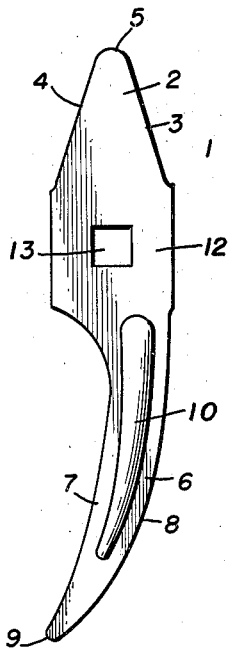
Figure 5 is a side elevation of one of the shaped cultivating rake elements.
Figure 6:
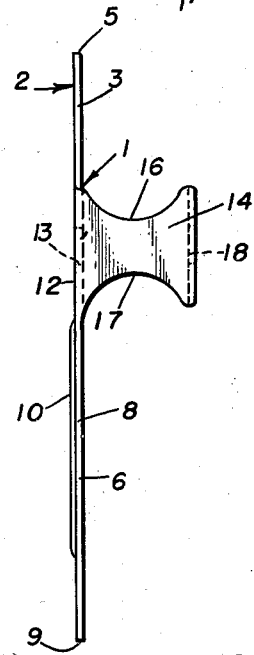
Figure 6 is a front elevation of one of the shaped cultivating rake elements.
Figure 8:
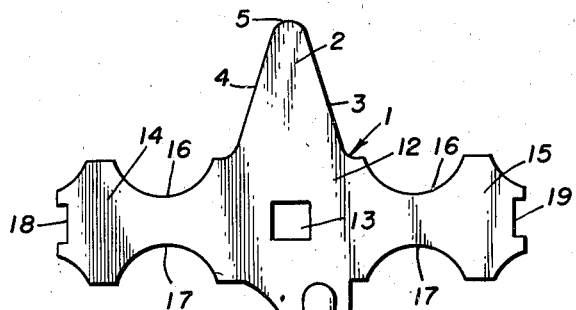
Figure 8:
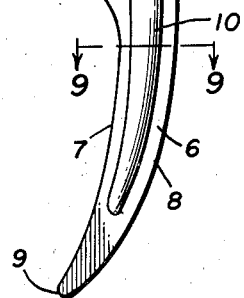
Figure 9:
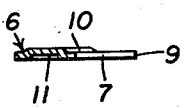

2 cultivating rake elements taken from the opposite side from the showing in Figure 5;

Figure 8 is a front elevation of one of the stamped out cultivating rake elements before the same has been shaped, showing the outwardly pressed tooth reinforcing rib, and Figure 9 is a sectional view taken on the line 9—9 of Figure 8.

Like characters of reference are used throughout the following specification and the accompanying drawings to designate corresponding parts.

In carrying out the invention, there is provided an improved form of self-cleaning rake made with a plurality of similarly formed and stamped cultivating rake tooth elements or blanks generally designated by the reference numeral 1, being stamped from a heavy gauge of metal. If desired, the cultivating rake tooth elements or blanks 1 may be made in any other manner, as for example, by casting or extruding.

Each cultivating rake element or blank 1 will include a short tooth 2 having upwardly extending inwardly tapering edges 3 and 4, terminating in the arcuate or rounded blunt end 5, which will be used for breaking up heavy clods of earth or the like.

Figure 7:
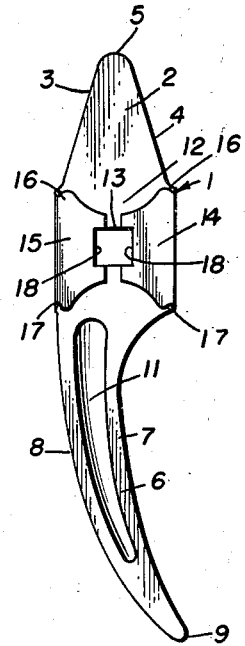
Figure 7 is a side elevation of one of the shaped

Each cultivating rake element or blank 1 will also include an integrally formed depending arcuate elongated tooth 6 having outwardly tapering opposite edges 7 and 8, terminating in the arcuate end or point 9, and formed with the arcuate similarly shaped longitudinally extending reinforcing rib 10 which is hollowed out as at 11 on its opposite side, as clearly illustrated in Figure 7 of the drawings.

A central body portion 12 is provided between each tooth 2 and 6, being substantially rectangular in shape and formed with a square centrally disposed aperture or opening 13, the purpose of which will be hereinafter more fully described.

Oppositely disposed laterally extending positioning and supporting wings 14 and 15 are formed integrally with the body portion 12, being separated therefrom by the oppositely extending upper and lower arcuate notches 16 and 17. The outer ends of the wing portions 14 and 15 are formed with the inwardly extending three sided seats or notches 18 and 19 respectively, for purposes later to be described.

Each cultivating rake element or blank 1 is shaped by bending the wing portions 14 and 15 at the inner ends of the arcuate notches or slots 16 and 17 at right angles, to extend in spaced parallel opposite relation, and the ends of said wing portions 14 and 15 are again bent at points adjacent the outer ends of the arcuate notches or slots 16 and 17 to extend inwardly and at right angles to the intermediate notched or slotted sides of said wing portions.

An elongated square rake head supporting rod 20 is provided, and is adapted to slidably receive the plurality of shaped cultivating rake elements 1 with their longer teeth 6 extending downwardly below the same.

The rod 20 will be inserted through the square apertures or openings 13 in the body portion 12 of the shaped rake elements 1, and the notches 18 and 19 will seat upon and interlock with the square rod 20 to non-rotatably support the rake elements 1 in position thereon.

Figure 1:
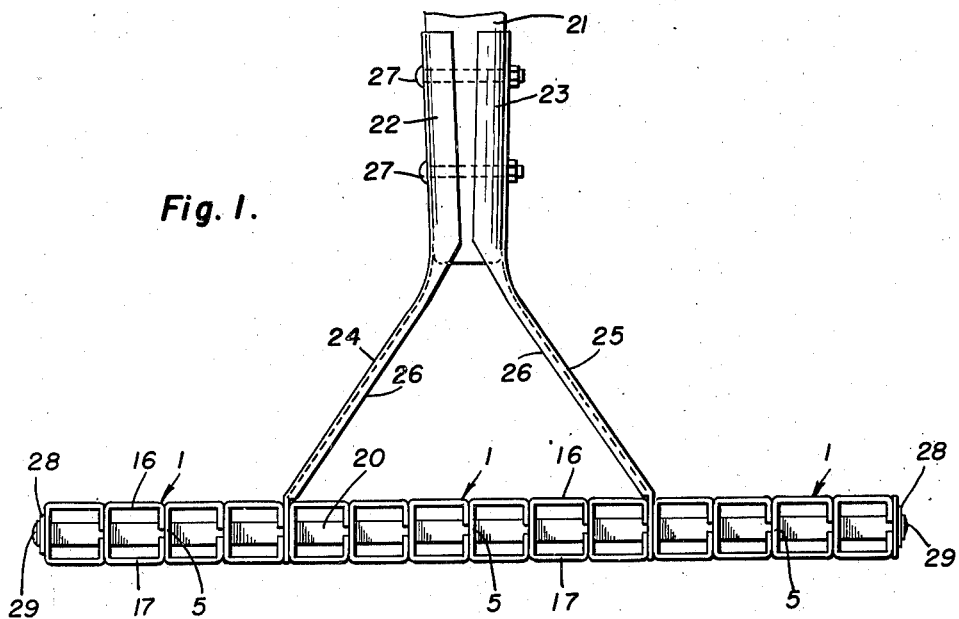
Figure 1 is a top plan view looking down upon the improved self-cleaning rake.
Figure 2:
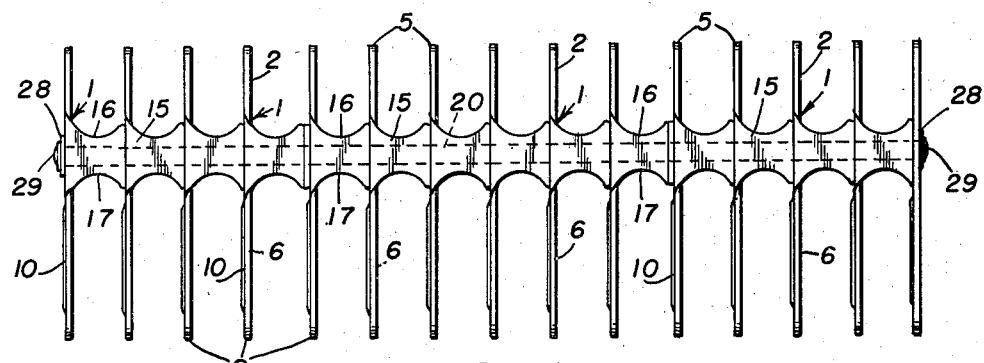
Figure 2 is a front elevation of the improved self-cleaning rake.
Figure 3:
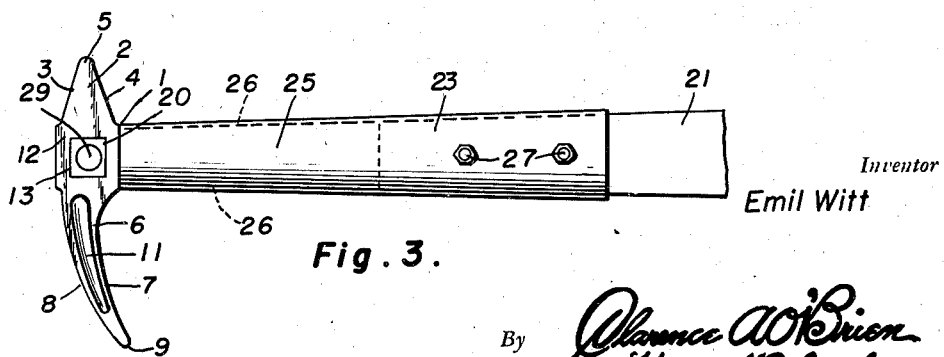
Figure 3 is an end elevation of the improved self-cleaning rake.
Figure 4:
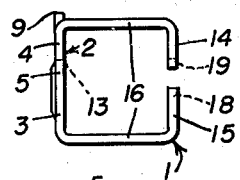
Figure 4 is a plan view looking down upon one of the shaped cultivating rake elements.

A long rake handle 21 will be provided and will support the upper arcuate ends 22 and 23 of the oppositely and downwardly extending bracket arm 24 and 25 which are formed substantially U-shape in cross section to provide the opposite side reinforcing flanges 26. The outer ends of the bracket arms 24 and 25 are bent inwardly to extend parallel with each other, and the same are formed with square apertures or openings (not shown) for slidably receiving and supporting the square rod 20, being interposed between adjacent shaped rake elements 1, as clearly illustrated in Figure 1 of the drawings. Bolts 27 will extend through the upper arcuate ends 22 and 23 of the bracket arms 24 and 25, and through the handle 21 to secure the several parts in operative position.

Washers 28 may be disposed over the outer ends of the rod 20 and secured in any desired manner, such as example by means of the fastening screws 29 or the like.

In operation, the short teeth 2 will be used for breaking up heavy clods of earth, and the longer reinforced teeth 6 will be used for deeper cultivating in heavy soil or wherever lighter work has to be done.

From the foregoing description, it will be apparent that there has been devised and provided a highly efficient form of self-cleaning rake which may be manufactured and produced at a relatively inexpensive cost.

While the preferred embodiment of the instant invention has been illustrated and described, it will be understood that it is not intended to limit the scope of the invention thereto, as many minor changes in detail of construction may be resorted to without departure from the spirit of the invention.

Having thus described my invention what I claim as new and desire to secure by Letters Patent of the United States is:

1. An article of manufacture comprising an elongated member forming the shank of a tine and having an aperture intermediate the ends thereof for receiving a rake cross bar and lateral arms extending from opposite sides of said member adjacent the aperture, each of said arms including upper and lower notches and a recess at the side edge thereof.

2. The combination of claim 1 wherein said elongated member includes a crescent-shaped arm having a protuberance thereon.

3. In a rake having a cross bar and a handle secured thereto; a plurality of tines carried by said cross bar in spaced relation thereon, each tine including a hub having a central aperture therein for receiving the cross bar, a tapered leg extending from said hub and disposed opposite the tine, and lateral arms extending from opposite sides of said hub adjacent the aperture, each of said arms including upper and lower notches and a recess at the side edges thereof, said arms being bent inwardly whereby said recesses are opposed to each other forming an opening in alinement with said aperture for receiving the cross bar.

4. The combination of claim 3 wherein said lateral arms are bent at a 90 degree angle adjacent the hub and further bent inwardly at a 90 degree angle adjacent the side edges thereof.

5. The combination of claim 4 wherein each of said tines is crescent-shaped and includes a protuberance.

EMIL WITT.

REFERENCES CITED

The following references are of record in the file of this patent:

UNITED STATES PATENTS

| Number | Name | Date |
|--------|------|------|
| 2,065,830 | Sherman | Dec. 29, 1936 |
| 2,355,840 | Ales | Aug. 15, 1944 |